United States Patent [19]

Bauer

[11] 4,139,175
[45] Feb. 13, 1979

[54] HEIGHT-ADJUSTABLE CHAIR OR TABLE PEDESTAL

[75] Inventor: Fritz Bauer, Altdorf b.Nüremberg, Fed. Rep. of Germany

[73] Assignee: Suspa Federungstechnik Fritz Bauer & Söhne OHG, Nüremberg, Fed. Rep. of Germany

[21] Appl. No.: 809,893

[22] Filed: Jun. 24, 1977

[30] Foreign Application Priority Data

Jul. 7, 1976 [DE] Fed. Rep. of Germany ....... 2630483

[51] Int. Cl.² ............................................. F16M 11/00
[52] U.S. Cl. .................................... 248/404; 248/416; 297/347
[58] Field of Search ............... 248/404, 405, 406, 421, 248/422; 297/330, 347, 348; 108/147

[56] References Cited

U.S. PATENT DOCUMENTS

| 1,364,882 | 1/1921 | Koken | 248/404 X |
|---|---|---|---|
| 1,887,328 | 11/1932 | Russell | 248/404 X |
| 2,653,648 | 9/1953 | Marshall | 297/347 |
| 2,920,684 | 1/1960 | Fante et al. | 297/330 |
| 3,179,369 | 4/1965 | Hale | 248/404 |
| 3,368,845 | 2/1968 | Watanabe | 297/347 X |
| 3,514,153 | 5/1970 | Maurer et al. | 297/330 X |
| 3,894,601 | 7/1975 | Gestring | 297/348 X |

FOREIGN PATENT DOCUMENTS

| 982564 | 1/1951 | France | 297/330 |
|---|---|---|---|
| 1239729 | 7/1971 | United Kingdom | 297/347 |

Primary Examiner—Lawrence J. Staab
Attorney, Agent, or Firm—Browdy and Neimark

[57] ABSTRACT

A height-adjustable chair or table pedestal having a hydraulically lifting cylinder and a piston rod telescopically extending therefrom is characterized by having the lower end of the piston rod mounted in the base of the device, with an energy source, hydraulic pump means and a lifting mechanism mounted as a sub-assembly out of view on the underface of the chair or table.

8 Claims, 2 Drawing Figures

HEIGHT-ADJUSTABLE CHAIR OR TABLE PEDESTAL

FIELD OF THE INVENTION

The present invention relates to adjusting the height of one element in relation to another, and, more particularly, to a height-adjustable chair or table pedestal.

BACKGROUND

Height-adjustable chairs and table pedestals are known of the general type having a lifting means consisting of a hydraulic lifting cylinder and a piston rod telescopically extendable therefrom, said lifting means being connected axially at one end with a height-adjustable plate and at the other end with a base, and with a pump assembly driven by an energy source, said pump assembly being connected with the lifting cylinder in the vicinity of its free end by a line for charging the lifting means with pressure-transmitting fluid.

Chair or table pedestals of this type are used for dentists' chairs and operating tables. In these, an electric motor-pump assembly is mounted on the base, and is used to charge the hydraulic lifting means with pressure-transmitting fluid. The electric motor is normally supplied with electricity from a wall socket. Furthermore, since such operating tables or dentists chairs are very bulky, and especially because they often have shrouds around their lower parts, esthetic problems are of no concern.

Moreover, tables with multiple pedestals are known, which are height-adjustable by means of spindle-and-nut drives powered by electric motors. Such height-adjustable tables pedestals are extremely complex from the structural standpoint. Also known are barbers' chairs which are often pumped by hand.

SUMMARY

Therefore, an object of the invention is to provide a height-adjustable chair or table pedestal of improved construction.

Another object is to provide a device of the type described above in such manner that it is esthetically pleasing and operationally reliable.

These and other objects of the present invention are achieved in accordance with the present invention by virtue of the fact that the power source and the pump assembly as well as the lifting means, combined in a subassembly, are mounted on the underside of the plate, and by the fact that the free end of the piston rod is mounted in the base. Because the pump assembly, preferably an electric motor-pump assembly, and the energy source, for which rechargeable battery is advantageously employed, are mounted as a subassembly on the underside of the plate, they are not apparent to the viewer, i.e., they do not have a disturbing optical effect. Because they are mounted immediately next to the lifting means, the overturning moment which they exert on the lifting means is especially small, i.e., the seals of the lifting means are subjected to only minimal shear forces. The fact that the lifting cylinder has its free end connected to the plate insures that a rigid line connection is provided during operation between the pump assembly and the lifting cylinder, i.e., no movable parts are required in this area which would be subject to wear and, in particular, could become leaky.

The fact that the free end of the piston rod is connected to the base makes possible an especially advantageous embodiment, known of itself, consisting in the fact that the lifting cylinder is disposed vertically displaceably in a guide tube mounted on the base. The piston rod disappears into this guide tube, and only a single guide tube is required in order to provide a hydraulically longitudinally adjustable column.

According to a further advantageous embodiment of the lifting means, known of itself, the lifting means can be made rotatable relative to the guide tube. This is particularly interesting in conjunction with the design of the pedestal according to the invention when used as a chair pedestal, since this allows an easily rotatable chair column to be provided in which no relative rotation between the piston rod and the lifting cylinder takes place during rotation. Moreover, the piston rod can be mounted in the guide tube with radial play relative to the tube. Hence, when the lifting cylinder is tilted relative to the guide tube, the piston rod can be freely deflected radially, so that there is no tilting between the piston rod and lifting cylinder, which would lead to accelerated wear or the guides and seals.

BRIEF DESCRIPTION OF THE DRAWING

Further advantages and features of the invention will be apparent from the description of an embodiment with reference to the drawing.

DETAILED DESCRIPTION OF EMBODIMENT

Figure 1:
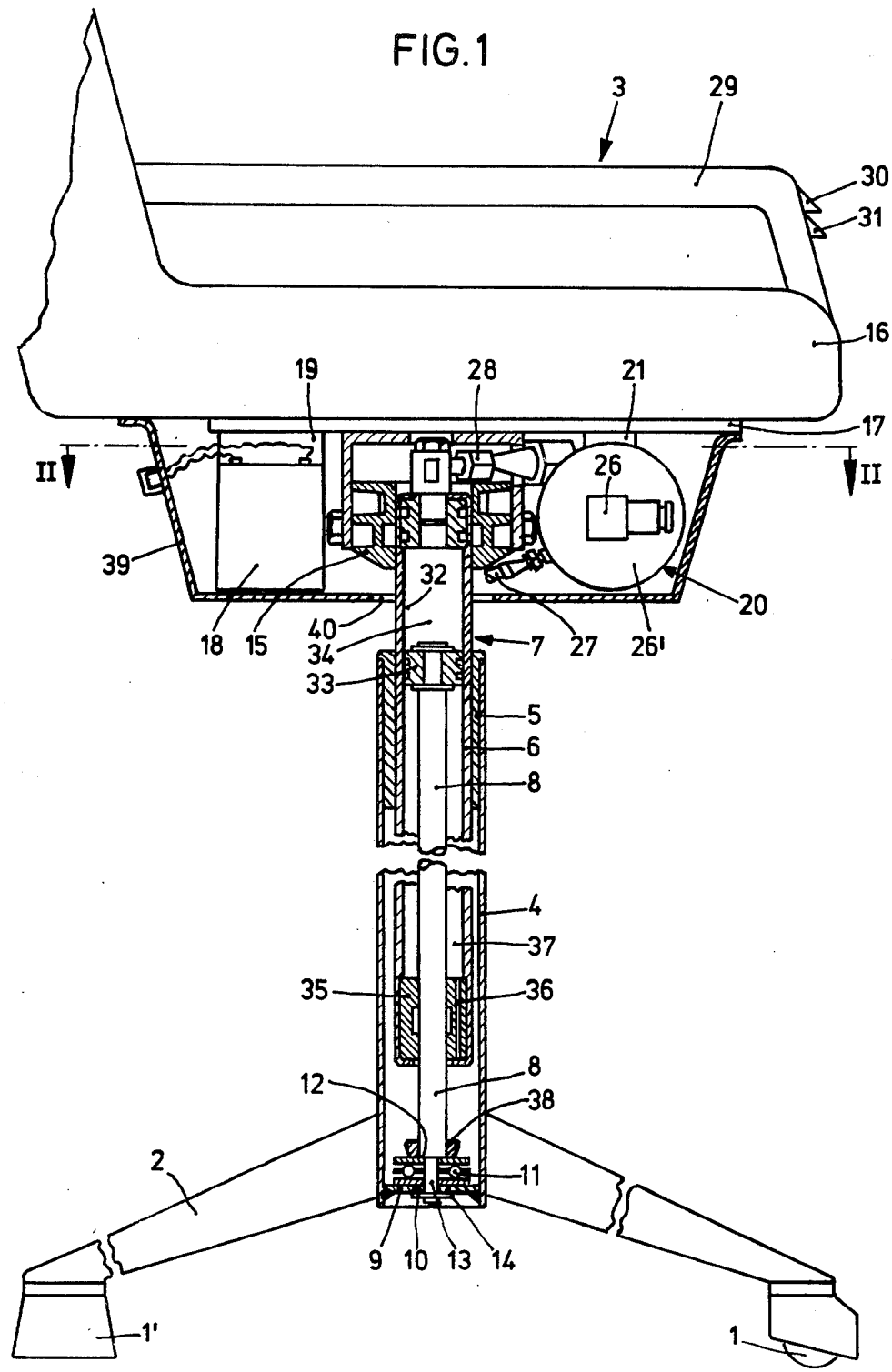
FIG. 1 is a side view of a chair with a pedestal according to the invention, shown partially cut away.

A cylindrical guide 4, projecting vertically upward, is mounted on a base 2 of a chair 3, the base being conventionally star-shaped and provided with casters 1 or feet 1'. A guide bushing 5 made of plastic or other suitable bushing material is provided in the upper part of the guide tube 4 along the interior thereof. A lifting cylinder 6 of a hydraulic lifting means 7 is disposed concentrically within the likewise cylindrical guide bushing 5, a piston rod 8 of the lifting means 7 projecting downwardly our from the lifting cylinder 6.

A holding plate 9 is welded into the guide tube 4 in the vicinity of the lower end thereof, said plate 9 having a concentric hole 10. A thrust ball bearing 11 is likewise disposed concentrically on the mounting plate 9, and the piston rod 8 is supported at its bottom axially by a collar 12 in the vicinity of its free end on the bearing 11. The free end of piston rod 8 has a pin 13, smaller in diameter than the piston rod, projecting through the thrust ball bearing 11 and the hole 10, and it is prevented from moving upward and axially by a circlip 14 on the underside of the mounting plate 9. The diameter of the pin 13 is smaller than the diameter of hole 10, so that the piston rod 8 has radial play relative to guide tube 4. Supporting piston 8 on thrust ball bearing 11 makes the piston rod and therefore the listing cylinder 6 of the lifting means 7 as well, rotatable relative to guide tube 4, without there necessarily being relative rotation between lifting cylinder 6 and piston rod 8.

The upper end of the piston rod 8 is provided with a piston 33 which slidingly engages the interior surface 32 of the lifting cylinder 6. Disposed at the lower end of the lifting cylinder 6 is a guide member 35 having an axial bore equal in diameter to the piston rod 8, and through which the piston rod slides.

The lifting cylinder 6 is firmly but releasably mounted with its upper end in a clamping means 15, such clamping means being centrally mounted in turn on a base plate 17 which supports the seat 16 of the chair 3. An energy source in the form of a rechargeable battery 18 is mounted on the base plate 17, directly behind the clamping means 15, by suitable mounting brackets 19. A pump assembly 20 is likewise bolted to base plate 17 by mounting brackets 21, the assembly 20 consisting of an electric motor 22, a pump 23 flanged thereto, and a reservoir 24, also connected coaxially to the latter. A valve assembly 25 is mounted endwise on the reservoir 24, a known pressure-relief valve 26 and a likewise known two-way valve 26' being mounted in valve assembly 25. A flexible line 27 for pressure-transmitting fluid is connected to the two-way valve 26', and its other end is connected via an appropriate connection 28 to the upper end of the lifting culinder 6.

Two push-button switches 30, 31 are conveniently mounted, e.g., on the front of at least one arm 29 of chair seat 16, for raising and lowering seat 16 relative to base 2. Each push-button switch 30, 31 is connected in a circuit between the battery 18 and the two-way valve 26' in the valve assembly 25. In addition, the push-button switch 30 for raising the chair seat 16 is connected in a circuit between the battery 18 and the motor 22.

When push-button switch 30 is actuated, the motor 22 is actuated and the two-way valve 26' is opened simultaneously, so that hydraulic fluid is pumped by the pump 23 from the reservoir 24 through line 27 into the lifting cylinder 6. The piston 33 is thus subjected to pressure, and is guided in a sealed manner relative to the inside wall 32 of lifting cylinder 6, i.e., the space 34 above piston 33 increases in size. The lifting cylinder 6 is thereby displaced upwardly relative to the base 2, i.e., seat 16 is lifted relative to base 2. When the push-button switch 30 is released, the motor 22 stops and the two-way valve closes. The seat 16 then remains in the elevated position.

When the push-button switch 31 is actuated, the two-way valve 26' opens. With a corresponding load on chair seat 16, for example the weight of a person sitting on it, the pressure-transmitting fluid is pushed back by the piston 33 out of the chamber 34 through line 27 and back into the reservoir 24. The chair seat 16 is thus lowered. When the push-button switch 31 is released, the two-way valve is again closed, whereby the chair seat remains in this new height adjustment position.

The piston rod is guided at the piston rod outlet side of lifting cylinder 6 in the guide 35, of sufficient axial length, such guide being provided with a duct 36 which connects chamber 37 (between piston 33 and guide 35) with the surrounding air, so that when the piston 33 is displaced relative to the lifting cylinder 6, chamber 37 has air added to or removed from it. A shock absorber 38, of elastic damping material, for example rubber, is mounted between the piston rod outlet end of lifting cylinder 6 and the thrust ball bearing 11.

Figure 2:
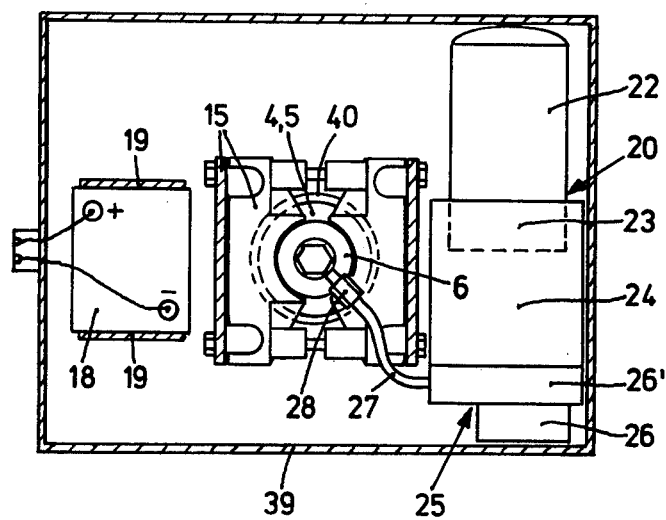
FIG. 2 is a cross section along line II—II in FIG. 1.

Battery 18, clamping means 15, pump assembly 20, and line 27 are covered by a shroud or housing 39 fastened to the base plate 17 or the underside of chair seat 16, the shroud further being provided with an opening 40 for lifting means 7 to pass through. The entire subassembly mounted on the underside of chair seat 61 and/or base plate 17 can be supplemented by a charger for rechargeable battery 18, said charger being readily mountable inside shroud 39 shown in FIG. 2.

It will be obvious to those skilled in the art that various changes may be made without departing from the scope of the invention and the invention is not to be considered limited to what is shown in the drawings and described in the specification.

What is claimed is:

1. In a height-adjustable chair or table pedestal with lifting means consisting of a hydraulic lifting cylinder and piston rod telescopically extendable therefrom, one end of said lifting means being axially connected with a height-adjustable plate and the other end being axially connected with a base, and a pump assembly driven by an energy source and connected with the lifting cylinder in the vicinity of its free end, said pump assembly serving to charge the lifting means with pressure-transmitting fluid, the improvement wherein:

said energy source, said pump assembly and said lifting means are combined in a subassembly mounted on the underside of said plate; the lower end of said piston rod is mounted in said base with the upper end of said lifting cylinder supporting said height-adjustable plate; said pump assembly comprising means to feed the pressure-transmitting fluid directly to the top of said cylinder; and wherein said lifting cylinder is mounted vertically displaceably in a guide tube mounted on said base.

2. A pedestal according to claim 1, wherein said height-adjustable plate is non-rotatably connected with lifting cylinder.

3. A pedestal, especially a chair pedestal, according to claim 1, wherein said lifting means is rotatable relative to said guide tube.

4. A pedestal, especially a chair pedestal, according to claim 1, wherein said piston rod is supported in said guide tube with radial play relative to the latter.

5. A pedestal according to claim 1, wherein said energy source comprises a rechargeable battery.

6. A pedestal according to claim 5, further comprising a charger for the battery in said subassembly.

7. A device in accordance with claim 1, further comprising means to shroud said subassembly mounted on the underside of said plate.

8. In a height-adjustable chair or table pedestal with lifting means consisting of a hydraulic lifting cylinder and piston rod telescopically extendable therefrom, one end of said lifting means being axially connected with a height-adjustable plate and the other end being axially connected with a base, and a pump assembly driven by an energy source and connected with the lifting cylinder in the vicinity of its free end, said pump assembly serving to charge the lifting means with pressure-transmitting fluid, the improvement wherein:

said energy source, said pump assembly and said lifting means being combined in a shrouded subassembly mounted on the underside of said plate; the upper end of said lifting cylinder supporting said height-adjustable plate and means between said pump assembly and the upper end of said lifting cylinder to feed the pressure-transmitting fluid to the top of said cylinder; said piston rod extending downwardly from said cylinder and out through the bottom thereof, with the lower end of said piston rod being mounted in said base; and said lifting cylinder being mounted vertically displaceably in a guide tube mounted on said base.

* * * * *

UNITED STATES PATENT AND TRADEMARK OFFICE
CERTIFICATE OF CORRECTION

PATENT NO. : 4,139,175
DATED : February 13, 1979
INVENTOR(S) : Fritz BAUER

It is certified that error appears in the above-identified patent and that said Letters Patent are hereby corrected as shown below:

Title page, [73] Assignee should read

--Suspa Federungstechnik Fritz Bauer
& Söhne OHG, Altdorf b. Nürnberg,
Fed. Rep. of Germany--

Signed and Sealed this

Thirty-first Day of July 1979

[SEAL]

Attest:

LUTRELLE F. PARKER

Attesting Officer        Acting Commissioner of Patents and Trademarks